US012607760B2

(12) United States Patent
Edwards et al.

(10) Patent No.: US 12,607,760 B2
(45) Date of Patent: Apr. 21, 2026

(54) MICROWAVE IMAGING SYSTEM

(71) Applicant: Spectroma Limited, Chipping Norton (GB)

(72) Inventors: Charlotte Elizabeth Edwards, Chipping Norton (GB); David John Edwards, Chipping Norton (GB)

(73) Assignee: Spectroma Limited, Chipping Norton (GB)

( * ) Notice: Subject to any disclaimer, the term of this patent is extended or adjusted under 35 U.S.C. 154(b) by 310 days.

(21) Appl. No.: 18/040,587

(22) PCT Filed: Aug. 5, 2021

(86) PCT No.: PCT/IB2021/057213
§ 371 (c)(1),
(2) Date: Feb. 3, 2023

(87) PCT Pub. No.: WO2022/029685
PCT Pub. Date: Feb. 10, 2022

(65) Prior Publication Data
US 2024/0255659 A1 Aug. 1, 2024

(30) Foreign Application Priority Data
Aug. 7, 2020 (GB) ...................................... 2012315

(51) Int. Cl.
*G01T 1/29* (2006.01)
(52) U.S. Cl.
CPC .................................. *G01T 1/2992* (2013.01)
(58) Field of Classification Search
CPC .......... G01N 22/00; G01S 7/024; G01S 7/03; G01S 13/42; G01S 13/865; G01S 13/867
See application file for complete search history.

(56) References Cited

U.S. PATENT DOCUMENTS 5,455,590 A * 10/1995 Collins ................... G01S 13/89
342/179
6,253,100 B1 6/2001 Zhdanov
(Continued)

FOREIGN PATENT DOCUMENTS

AU 2007100353 A4 12/2007
CN 106108899 A 11/2016
(Continued)

OTHER PUBLICATIONS

M. Asefi et al., "An Experimental Phantom Study for Air-Based Quasi-Resonant Microwave Breast Imaging", IEEE Transactions on Microwave Theory and Techniques, vol. 67, No. 9, pp. 3946-3954. (Year: 2019).*

(Continued)

*Primary Examiner* — Casey Bryant
(74) *Attorney, Agent, or Firm* — Withrow + Terranova, PLLC; Vincent K. Gustafson

(57) ABSTRACT

A microwave imaging system and method are disclosed for generating a 3-D map of a body. The system comprises a source of coherent microwave radiation for irradiating the body, at least one microwave detector for detecting at a plurality of locations around the body the amplitude and phase of radiation that has passed through, or has been reflected by, the body, an analyser connected to receive signals from the or each detector and from the source and operative to produce a holographic image indicative at each detection location the phase of the received radiation relative to the phase of radiation received directly from the source at the same location, and a processor for processing the holographic image to calculate in three dimensions the positions of localized physical parameters within the body.

6 Claims, 2 Drawing Sheets

(56)  References Cited

U.S. PATENT DOCUMENTS

| | | | |
|---|---|---|---|
| 8,179,325 B2 | 5/2012 | Edwards et al. | |
| 2005/0107692 A1 | 5/2005 | Li et al. | |
| 2007/0015993 A1 | 1/2007 | Ciocan et al. | |
| 2017/0199134 A1* | 7/2017 | LoVetri | A61B 5/0536 |
| 2021/0137406 A1* | 5/2021 | Lepple-Wienhues | A61B 5/0507 |

FOREIGN PATENT DOCUMENTS

| | | | |
|---|---|---|---|
| CN | 109188431 A | 1/2019 | |
| CN | 110960216 A | 4/2020 | |
| JP | 2014198067 A | 10/2014 | |
| WO | WO-0166030 A1 * | 9/2001 | A61K 41/008 |
| WO | WO-2006080006 A1 * | 8/2006 | G01S 13/04 |
| WO | 2007017861 A2 | 2/2007 | |
| WO | 2013005134 A2 | 1/2013 | |
| WO | 2013018024 A1 | 2/2013 | |
| WO | 2016005909 A1 | 1/2016 | |
| WO | 2018189800 A1 | 10/2018 | |
| WO | 2019034758 A1 | 2/2019 | |

OTHER PUBLICATIONS

C. Gilmore et al., "A Wideband Microwave Tomography System With a Novel Frequency Selection Procedure," IEEE Transactions on Biomedical Engineering, vol. 57, No. 4, pp. 894-904. (Year: 2010).*

Bennett, et al., "Microwave Holographic Metrology of Large Reflector Antennas," IEEE Transactions on Antennas and Propagation, vol. 24, Issue 3, May 1976, pp. 295-303.

Braunreiter, et al., "On the Use of Space-Time Adaptive Processing and Time-Frequency Data Representations for Detection of Near-Stationary Targets in Monostatic Clutter," IEEE Workshop on Statistical Signal and Array Processing, 2000, pp. 472-475.

Edwards, "Determination of Large Reflector Profiles by Microwave Wavefront Reconstruction," Post Office Electrical Engineers Journal, vol. 74, 1981, pp. 106-112.

Ghavami, et al., "UWB Microwave Imaging of Objects with Canonical Shape," IEEE Transactions on Antennas and Propagation, vol. 60, Issue 1, Jan. 2012, pp. 231-239.

Ghavami, et al., "Huygens Principle-based approach for UWB medical imaging," 41st European Microwave Conference, 2011, pp. 1257-1260.

Ghavami, et al., "Huygens Principle Based Imaging of Multilayered Objects with Inclusions," Progress in Electromagnetics Research B, vol. 58, 2014, pp. 139-149.

Ghavami, et al., "Huygens Principle based technique for Microwave Imaging of Objects with Inclusions, " International Conference on Electromagnetics in Advanced Applications, 2011, pp. 1044-1047.

Ghavami, et al., "Non-iterative beamforming based on Huygens principle for multistatic ultrawide band radar: application to breast imaging," IET Microwaves, Antennas, and Propagation, vol. 9, Issue 12, Sep. 2015, pp. 1233-1240.

Ghavami, Navid, "Ultra-Wideband Imaging Techniques for Medical Applications," PHD Thesis, Oxford University, 2013, 159 pages.

Hassanein, et al., "UWB Tomography via Simulated Optical Systems," International Symposium on Antenna & Propagation, Taipei, Taiwan, 2008, 4 pages.

Jalilvand, et al., "Hemorrhagic Stroke Detection via UWB Medical Imaging," Proceedings of the 5th European Conference on Antennas and Propagation, Apr. 2011, pp. 2911-2914.

Lukama, et al., "Application of three-branch polarisation diversity in the indoor environment," IEEE Proceedings, vol. 150, Issue 5, Oct. 14, 2003, pp. 399-403.

Mielenz, Klaus, "Computation of Fresnel Integrals," Journal of Research of the National Institute of Standards and Technology, vol. 102, Issue 3, 1997, 3 pages.

Mtumbuka, et al., "Experimental Investigation of a 3x3 Polarisation MIMO System in an Indoor Environment," International Waveform Diversity and Design Conference, 2004, 5 pages.

Staderini, Enrico, "UWB Radars in Medicine," IEEE Aerospace and Electronics Systems Magazine, Aug. 2002, vol. 17, Issue 1, 13 pages.

Tiberi, et al., "A Mode Matching—Bessel functions based approach for UWB Microwave Imaging," IEEE Antennas and Propagation Society International Symposium, 2010, 4 pages.

Tiberi, et al., "Ultrawideband microwave imaging of cylindrical objects with inclusions," IET Microwaves, Antennas, and Propagation, vol. 5, Issue 12, Sep. 2011, pp. 1440-1446.

Wang, et al., "Imaging of 3-D Dielectric Objects Using Far-Field Holographic Microwave Imaging Technique," Progress in Electromagnetics Research B, vol. 61, 2014, pp. 135-147.

Wang, et al., "Investigation of Antenna Array Configurations Using Far-field Holographic Microwave Imaging Technique," Progress in Electromagnetics Research M, vol. 42, 2015, 11 pages.

Yurduseven, et al., "A Reconfigurable Millimeter-wave Spotlight Metasurface Aperture Integrated with a Frequency-Diverse Microwave Imager for Security-Screening," Proceedings of the SPIE, vol. 10634, May 11, 2018, 9 pages.

Search Report for United Kingdom Patent Application No. GB2012315.4, mailed Feb. 8, 2021, 4 pages.

International Search Report and Written Opinion for International Patent Application No. PCT/IB2021/057213, mailed Oct. 15, 2021, 10 pages.

Office Action for European Patent Application No. 21758141.2 mailed Jul. 3, 2025, 5 pages.

English translation of First Office Action and Examination Report for Chinese Patent Application No. 202180057245.6 mailed May 6, 2025, 9 pages.

* cited by examiner

40

MICROWAVE IMAGING SYSTEM

CROSS-REFERENCE TO RELATED APPLICATIONS

This application is a 35 U.S.C. § 371 national phase filing of International Application No. PCT/IB2021/057213, filed on Aug. 5, 2021, and claims the benefit of United Kingdom Patent Application No. 2012315.4, filed on Aug. 7, 2020, wherein the entire contents of the foregoing applications are hereby incorporated by reference herein.

FIELD OF THE INVENTION

The present invention relates to a microwave imaging system for providing a three dimensional map indicative of localized physical parameters of a biological body. Such an imaging system may for example be used to provide an image capable of differentiating between different tissue types within the interior of a human body.

BACKGROUND

There are many well known methods used for medical imaging that make use of the fact that different parts of the body have different physical properties. Because of this, if irradiated with different types of energy, one can develop an image capable of differentiating between different types of tissue. For example, X-ray images are absorbed differently by bone and soft tissue. Other known techniques include ultrasound, MRI and tomography (CT) scans.

Microwave imaging, and radio imaging in general, has developed in a number of fields as the capabilities of computing power have grown. In the medical imaging field, there has been much interest over the last two decades to apply radio imaging techniques in order to produce high quality images and furthermore produce detailed information on specific tissue types, recognizing the frequency dependence of the dielectric properties of biological tissue [see ref. 6].

Radio imaging in the medical field has broadly evolved into different approaches. The establishment of worldwide ultra-wideband regulations, initially for low power short range and license free communications devices, has prompted an interest in using the frequency bands covered by the standards, paying attention to the power and power spectral density requirements of the regulations. There have been a number of reports of this approach [see refs. 5 and 6].

Tomographic implementations have also been reported and holographic imaging implementations have been published. There have also been clinical trials which support the promise of microwave imaging in this field [see ref. 10].

OBJECT OF THE INVENTION

The present invention therefore seeks to provide a microwave imaging system capable of producing images with greater contrast and higher resolution, offering more information on tissue type and tissue differentiation, while also enabling fast image acquisition at relatively low cost.

SUMMARY OF THE INVENTION

According to one aspect of the invention, there is provided a method of generating a 3-D map of a body which comprises:

irradiating the body with coherent microwave radiation from a source, detecting at a plurality of locations around the body the amplitude and phase of radiation that has passed through, or has been reflected by, the body, determining at each location the phase of the received radiation relative to a reference signal indicative of the phase of the transmitted radiation to produce a holographic image of the body, and processing the holographic image to calculate the positions in three dimensions of localized physical parameters within the body.

An optical hologram is an interference pattern between the light reflected by an object onto an image plane and light that is received at the image plane directly from the laser source. The light received directly from the source provides a reference phase and an interference pattern is created because the phase of light that has been reflected by the body will depend on the path length of the light rays. When viewed using coherent light, a hologram can provide a three-dimensional representation of the object.

In the present invention, in an analogous manner, if both the phase and amplitude of radiation received from a body, when it is irradiated with coherent microwave radiation, are determined at different locations around the body, then the data can be processed to determine the location in three dimensions of any physical discontinuities, or localized physical parameters, that caused the reflection or refraction of the radiation.

In an embodiment of the invention, the transmitted microwave energy comprises several frequencies. It is possible, for example, to sweep the frequency of the transmitted radiation and then to process the images obtained at different frequencies to achieve higher resolution then possible with any one frequency.

When radiation is reflected by a discontinuity, the resulting image can be dependent on the plane of polarisation of the radiation. In an embodiment the invention, images may be produced using different planes of polarisation of the both the transmitting and receiving devices so as to permit improved characterisation of the measured physical discontinuities.

While it would be possible to provide a single stationary transmitting element and a single receiving element movable around the body, in a practical implementation of the invention, arrays of transmitting and/or receiving elements may be provided on opposite sides of the body to be imaged.

In some embodiments of the inventions, the propagation paths of the measured signals are not all parallel. It has also been found that arrays having non-equally spaced array elements help to reduce undesired ghosting.

Techniques to analyse the detected radiation have already been developed in other fields and need not be described herein in detail. In the radio astronomy field, powerful imaging algorithms have been applied to the huge amounts of data received from large baseline interferometer systems and processed to provide radio images of stellar objects such as nebulae and stellar radio sources in general. Whole sky maps are now available at various frequencies and various angular resolutions [ref. 1]. However, these imaging techniques provide far field images as the aperture size of the instrument relative to its wavelength of operation is extremely small compared with the distance of the object being imaged. The image reconstruction approach broadly follows the optical analogue in which the describing mathematics is approximated so that the range term is eliminated, and the image is presented in 2D angular space with no range information. The mathematics is governed by 2D Fourier integrals [refs. 7,8].

As the aperture size of the recording instrument becomes significant compared to the range of the observed object, the mathematics retains range information and the mathematical processing is governed by near field integral expressions. This mathematics is generally called the Fresnel integrals [ref. 2].

In some embodiments, the emitted and received radiation covers a bandwidth of at least twice the centre frequency of the measurement.

Though the radiation can only be emitted with two polarisation axes, the received radiation may, following scattering, be polarised along three axes. In some embodiments, the system is capable of generating a three-axis electromagnetic field response map of the object within the enclosed volume.

In accordance with a second aspect of the invention, there is provided a microwave imaging system for generating a 3-D map of a body, comprising a source of coherent microwave radiation for irradiating the body, at least one microwave detector for detecting at a plurality of locations around the body the amplitude and phase of radiation that has passed through, or has been reflected by, the body, an analyser connected to receive signals from the or each detector and from the source and operative to produce a holographic image indicative at each detection location the phase of the received radiation relative to the phase of radiation received directly from the source at the same location, and a processor for processing the holographic image to calculate in three dimensions the positions of localized physical parameters within the body.

In some embodiments, the source and detector may comprise transmitting and receiving antenna arrays that are supported on a substrate in the form of a cylinder or tube of regular cross section to surround the body.

The transmitting and receiving antenna arrays may be connected to a master frequency-controlled oscillator and transmission line network to deliver coherent spatial electromagnetic information to a receiver system representing a radio hologram.

The transmit and receive antenna arrays may be movable or switchable between transmit and receiver function to yield 360° information.

As the wavelength of the radiation within the body is less than the wavelength in air, the surface profile of the body being imaged needs to be taken into consideration in the processing of the receiving signals. For this reason, embodiments of the invention may include devices to enable the surface profile of an object to be measured contemporaneously with the electromagnetic measurements. Such devices may rely on reflection of light or ultrasound.

Systems that record amplitude and phase at different locations are known, for example from WO2016/005909, but these are distinguished from the invention in that they rely on the Modulated Scatterer Technique (MST). This particular way of recovering phase and amplitude of a wave requires specific modulation of the scattering receiver antenna by a secondary source oscillator and a device called a lock-in amplifier. In order to record the phase and amplitude at various points each receive antenna has to have the modulating signal applied to it in sequence. By contrast, systems of the invention are coherent in that the transmit signal is directly fed in parallel to the detectors of the receiving system, thereby enabling the capture of phase and amplitude (and polarisations) of multiple positions in the same time frame. By sweeping the frequency, multiple frequencies can be recorded within one sweep time frame which typically can be 250 mS or less.

BRIEF DESCRIPTION OF THE DRAWINGS

The invention will now be described further, by way of example, with reference to the accompanying drawings, in which.

DETAILED DESCRIPTION OF THE DRAWINGS

System Overview

The drawings show an imaging system for an object, such as human or animal tissue, providing localized material information in three dimensions which simultaneously illuminates the object with an interrogating electromagnetic wave by digitally recording a radio frequency hologram with multi-polarisation information on features within the addressed volume of interest. The system consists of transmit and receive arrays to provide optimum spatial resolution with a minimum number of elements in the transmit and receiver arrays.

The transmit array launches a coherent electromagnetic wave which is used to provide the interrogation signal of the object and the receive array is used as a coherent receiver to provide near diffraction limited imaging capability with the aid of suitable digital signal processing. To simultaneously and coherently detect by the receive array the received signal scattered by the target object, a frequency and phase reference signal is taken from the master transmit oscillator and is combined with the received signal at each receiver element to provide amplitude, phase and polarisation information at each receive element location with due regard to the relative transmit element position.

The transmit and receive elements are positioned in such a way that the planes of the wave vectors occupied by the transmitted and received waves can be configured to record slices that are not parallel. The array configuration is able to provide more complete information on the scattering objects within the interrogated volume from a number of view angles. In this way, the system records a series of radio holograms of the object of interest which is polarisation sensitive and contains multiple view and slice information which is not possible using other imaging modalities.

Figures 3A, 3B, 4:
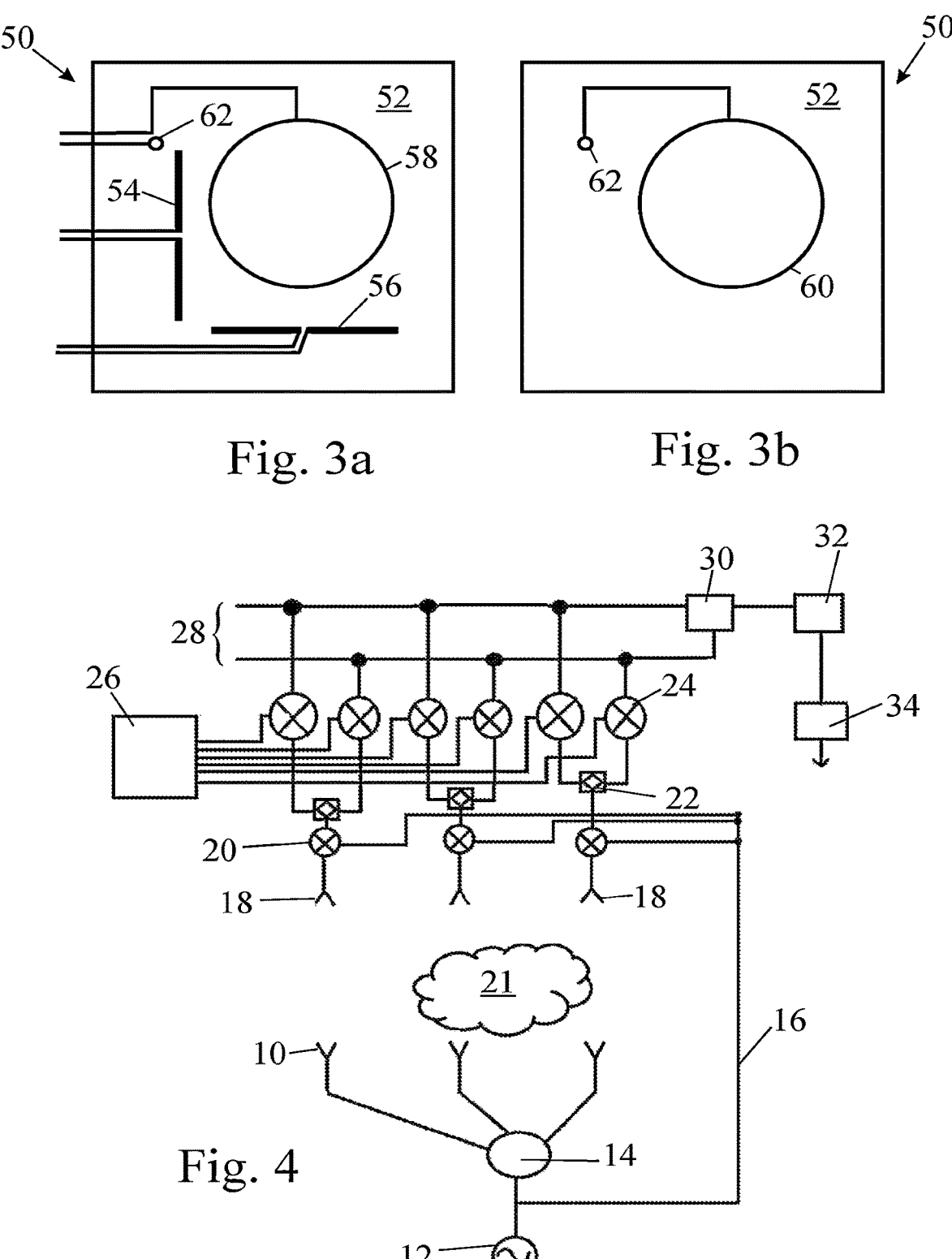
FIGS. 3a and 3b are views from above and below, respectively, a tripolar antenna element.
FIG. 4 is a schematic diagram of a microwave imaging system of the invention.

Referring first to FIG. 4, the illustrated microwave imaging system comprises a transmit array 10 that is excited by a stable oscillator 12 to which the individual elements of the antenna are connected by way of a signal splitter 14. In this way, the transmit array 10 produces a stable fixed frequency wave that is directed at the body 21 being imaged. The oscillator can be adjusted to work at different frequencies but for clarity, and in any one data gathering operation, only a single frequency is considered.

The signal splitter 14 additionally takes off a portion of the output of the oscillator 12 to be used as a reference signal that is applied via a transmission line 16 to all the elements of a receiving antenna array 18.

The output of each of the receiving antenna elements 18 is connected to a respective mixer 20 that combines the signals received by the antenna elements with the reference signal of the oscillator 12 received via the transmission line 16. The output of each mixer 20 is in turn connected to a quadrature splitter 22 to produce signals that represent the real and imaginary components of the scattered signal at each receiver antenna element 18.

The outputs from the quadrature splitters 22 are next fed to mixers 24 that are connected to an encoder 26. The encoder 26 in one embodiment acts as a multiplexer to enable the signals from the antenna elements 18 to share a common communications bus 28. The processor 30 in such an implementation would be a de-multiplexing processor that performs the conjugate process of the decoder 26 and separates the signals for presentation to a holographic processor 32.

As an alternative to being designed as a multiplexer, the encoder 26 may be implemented as a spread spectrum processor where the sampled signals are multiplied by a family of pseudo random binary sequences such that all the signals can be transmitted along the same wires and occupy the same frequency band.

In this case, the processor 30 would be a correlator processor that takes the known spreading sequences and performs a multiplication operation simultaneously on the signal on the common communications bus. This operation is termed code division multiplexing (CDM). The output of each multiplication process is then filtered and the output of each are the recovered signals from 18.

The holographic processor 32 generates signals indicative of the spatial distribution of the phase and amplitude at the receive site. Following this, a processor 34 processes this data using Fresnel integral based back propagation techniques [refs. 16-24] to generate an image of the object at user defined planes within the object which can be non-orthogonal.

Figure 1:
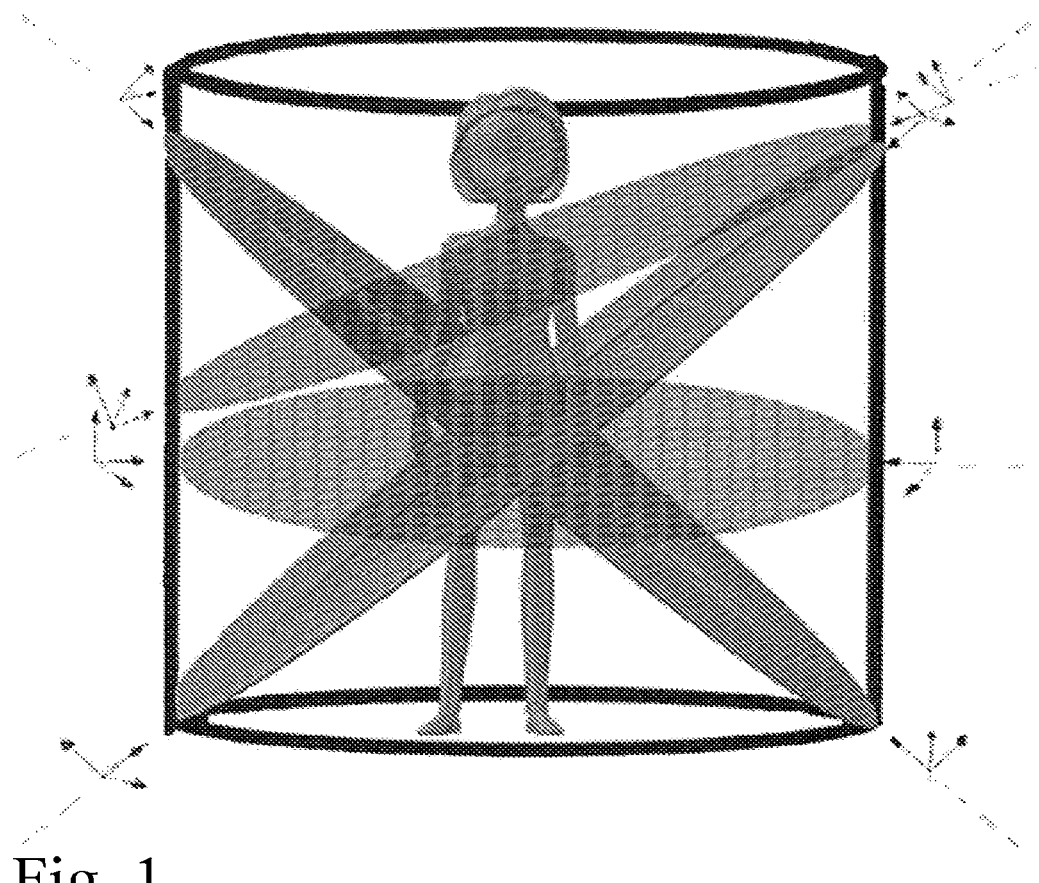
FIG. 1 shows a multi-slice multi-polarisation capture system configuration.
Figure 2:
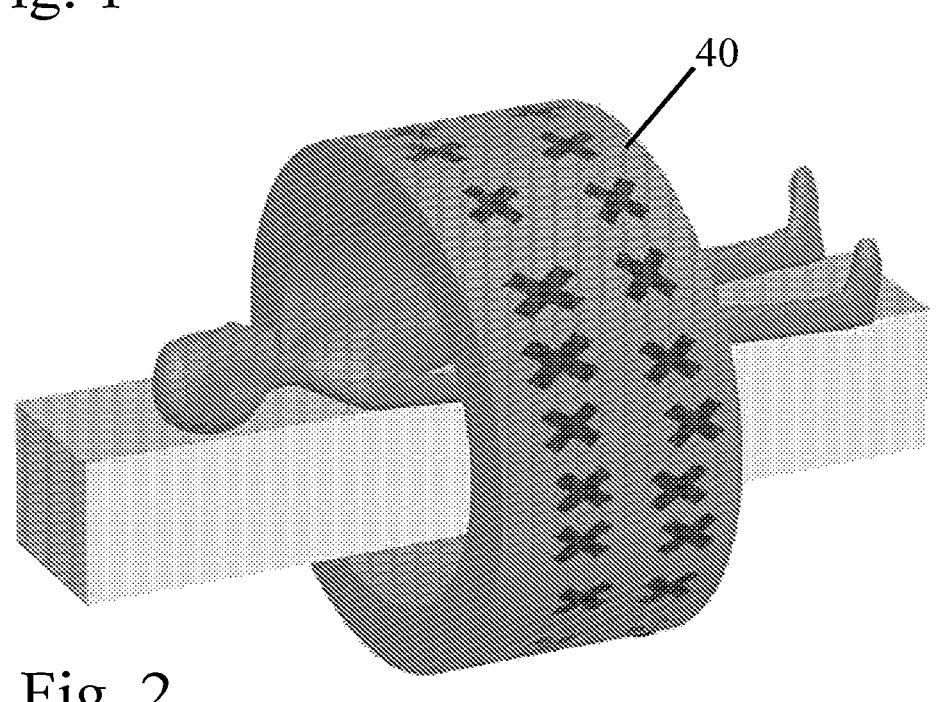
FIG. 2 shows a tube carrying antenna arrays disposed around a human body in the process of being imaged.

The transmitting and receiving antenna elements may be arranged on a tube 40 surrounding the body in the manner shown in FIG. 2, wherein the position of each antenna element is marked with an X. It will be noted that the antenna element spacing is intentionally non-uniform. By suitably positioning and orienting the tube 40 in relation to the body being imaged it is possible to produce images in the various slice capture planes shown in FIG. 1, the image produced for each slice being derived from radiation polarised along three axes represented by arrows in FIG. 1.

An embodiment of a three-axis antenna is shown in FIG. 3. The antenna element 50 comprises a dielectric substrate 52 with printed conductors on its opposite sides. On the side shown in FIG. 3a, the printed conductors form two dipoles 54 and 56 that have vertical and horizontal polarisation axes, respectively, in the plane of the drawings. A third antenna having a polarisation axis normal to the plane of the drawing is formed by two loops 58 and 60 disposed on the opposite sides of the substrate 52, the connection to the loop 60 on the underside being established via a plated through hole 62.

It should be mentioned that it is alternatively possible to use biconical antennae. Furthermore, though three-axis polarisation is preferred, two-axis polarisation may be employed.

In some embodiments, each individual antenna element on the tube 40 may be switched so that it may selectively serve as a transmitting and a receiving antenna. Alternatively, the tube 40 may be rotatable about the body being imaged.

In parallel with the processing described above, the system comprises optical or acoustic transmitters and receivers mounted on the tube 40 and connected to a conventional processor to generate a 3D map of the surface of the body being imaged. This allows the processing of the microwave radiation to take into account the distance travelled by the EM waves through air before passing through the body.

Using a system as described above, it is possible to produce images at multiple frequencies, multiple planes and multiple polarisation states that are combined under user control using image rendering algorithms, taking into account frequency dependent electromagnetic properties of particular tissue types, to give a 3D mapped representation (a hologram) of tissue properties within the imaged volume [ref. 12].

Further processing delivers the ability to render a tomographic presentation which can be rotated and manipulated by the user in the manner of conventional CT and MRI images but with further information on the vector electromagnetic properties of the tissue.

The spatial resolution is ultimately limited by the highest transmit frequency used in the hologram generation and the wavelength of that frequency within the medium of the object. Ultimately this upper frequency is determined by the overall frequency response of the antenna elements and the other radio components in the system. This limit can be determined at the design stage by the choice of suitable components.

Radio frequency electronics generally increases in cost as the frequency increases, but there is economic gain to be had by using those particular frequencies which are used in high volume (consumer, automotive and military) applications and widely available and ideally low cost products. The invention therefore sets out to utilize these types of electronics and components where possible in any new device and combined with the attractiveness of very low cost computing power that is available in such products as GPU cards and gaming PCs.

A further consumer growth area has been in broadcast television and other relatively high frequency communications and radar devices. This has generated a growth in the availability of higher frequency components working in the microwave and millimeter wave range.

It should be noted that the wavelengths of microwave frequencies (in the range of 6 to 10 GHz) and millimeter wave frequencies within biological tissue is much less than in free space, so the achievable spatial resolution is very much smaller than in free space.

A draw back reported in the literature has been the absorption of radio waves by tissue. While this is true for a number of frequencies, in coherent systems offer very large dynamic ranges and current available equipment can cope well with dynamic ranges of up to a 100 dBs or so (and beyond). Therefore, coherent approaches offer the ability to work with much lower signal levels, and modern signal processing which can include correlation algorithms known from radio astronomy, offer the prospect of working with extremely lossy materials and poor signal to noise ratios.

The problem of signal processing can be reduced greatly by using known communications techniques to encode the received signal at each received point so that this reduces the possibility of unwanted signals coupling into the recorded data. One can also reduce the processing costs by down converting the signals coherently to a lower frequency base band.

Images at multiple frequencies, multiple planes and multiple polarisation states are combined under user control using image rendering algorithms, taking into account frequency dependent electromagnetic properties of particular tissue types, to give a 3D mapped representation (a hologram) of tissue properties within the imaged volume [ref. 12].

Further processing delivers the ability to render a tomographic presentation which can be rotated and manipulated by the user in the manner of conventional CT and MRI images but with further information on the vector electromagnetic properties of the tissue.

Additional imaging information can be obtained by rotating or changing the disposition of the transmit and receive array either mechanically or electronically.

The spatial resolution is ultimately limited by the highest transmit frequency used in the hologram generation and the wavelength of that frequency within the medium of the object. Ultimately this upper frequency is determined by the overall frequency response of the antenna elements and the wother radio components in the system. This limit can be determined at the design stage by the choice of suitable components.

The computational methods that need to be employed in processing of the received signals are not described herein but are known in the art and well documented in the published articles and books listed below, all of which are hereby incorporated herein by reference.

Although various specific implementations have been described, the skilled person will appreciate that the invention may be embodied in many other forms.

Approximately as employed herein means ±10%.

In the context of this specification "comprising" is to be interpreted as "including".

Aspects of the invention comprising certain elements are also intended to extend to alternative embodiments "consisting" or "consisting essentially" of the relevant elements.

Where technically appropriate, embodiments of the invention may be combined.

Embodiments are described herein as comprising certain features/elements. The disclosure also extends to separate embodiments consisting or consisting essentially of said features/elements.

Technical references such as patents and applications are incorporated herein by reference.

Any embodiments specifically and explicitly recited herein may form the basis of a disclaimer either alone or in combination with one or more further embodiments.

REFERENCES

1. "The Square Kilometre Array: An Engineering Perspective", Peter J. Hall Springer Science & Business Media, 2005—Science
2. Mielenz, Klaus D. "Computation of Fresnel integrals." Journal of research of the National Institute of Standards and Technology 102.3 (1997): 363.
3. "Experimental investigation of a 3×3 polarisation MIMO system in an indoor environment," M. C. Mtumbuka and D. J. Edwards, 2004 International Waveform Diversity & Design Conference, Edinburgh, 2004, pp. 1-5.
4. "Application of three-branch polarisation diversity in the indoor environment," in IEE Proceedings Communications, L. C. Lukama, D. J. Edwards and A. Wain, vol. 150, no. 5, pp. 399-, 14 Oct. 2003.
5. "UWB microwave imaging of objects with canonical shape," Ghavami, N., G. Tiberi, D. J. Edwards, and A. Monorchio, IEEE Transactions on Antennas and Propagation, Vol. 60, No. 1, 231-239, 2012.
6. "Huygens Principle Based Imaging of Multilayered Objects with Inclusions," N. Ghavami, G. Tiberi, D. J. Edwards, A. Safaai-Jazi, and A. Monorchio, Progress In Electromagnetics Research B, Vol. 58, 139-149, 2014.
7. "Investigation of Antenna Array Configurations Using Far-Field Holographic Microwave Imaging Technique," L. Wang, A. M. Al-Jumaily, and R. Simpkin, Progress In Electromagnetics Research M, Vol. 42, 1-11, 2015.
8. "Imaging of 3-D Dielectric Objects Using Far-Field Holographic Microwave Imaging Technique", Lulu Wang, Ahmed M. AI-Jumaily, and Ray Simpkin, Progress In Electromagnetics Research B, Vol. 61, 135-147, 2014
9. Jalilvand, M., Li, X., Zwick, T., Wiesbeck, W., & Pancera, E. (2011, April). Hemorrhagic stroke detection via UWB medical imaging. In Proceedings of the 5th European Conference on Antennas and Propagation (EUCAP) (pp. 2911-2914). IEEE.
10. Staderini E M. UWB radars in medicine. IEEE aerospace and electronic systems magazine. 2002 Aug. 7; 17(1):13-8.
11. Braunreiter et al., "On the Use of Space-Time Adaptive Processing and Time-Frequency Data Representation for Detection of Near Stationary Targets in Monostatic Clutter" Proc. 10th IEEE Workshop on Statistical Signal and Array Processing. pp. 472-475. (2000).
12. J. Bennett, A. Anderson, P. McInnes and A. Whitaker, "Microwave holographic metrology of large reflector antennas," in IEEE Transactions on Antennas and Propagation, vol. 24, no. 3, pp. 295-303, May 1976.
13. Edwards, D. J., Determination of large reflector profiles by microwave wavefront reconstruction. Post Office Electrical Engineers Journal, 74, pp. 106-12. 1981.
14. Hassanein A D, Edwards D J, Stevens C J. UWB Tomography via Simulated Optical Systems. In International Symposium on Antenna & Propagation (ISAP08). Taipei, Taiwan 2008.
15. Edwards D J et al, "PLANAR TRIPOLAR ANTENNA U.S. Pat. No. 8,179,325 B2
16. G. Tiberi; N. Ghavami; D. J. Edwards; A. Monorchio, "Ultrawideband microwave imaging of cylindrical objects with inclusions", IET microwaves, antennas & . . . , Volume 5, Issue 12, 16 Sep. 2011, p. 1440-1446 DOI: 10.1049/iet-map.2011.0033, Print ISSN 1751-8725, Online ISSN 1751-8733
17. N. Ghavami, G. Tiberi, D. J. Edwards and A. Monorchio, "UWB Microwave Imaging of Objects With Canonical Shape," in IEEE Transactions on Antennas and Propagation, vol. 60, no. 1, pp. 231-239, January 2012, doi: 10.1109/TAP.2011.2167905.
18. Navid Ghavami; Penny Probert Smith; Gianluigi Tiberi; David Edwards; Ian Craddock "Non-iterative beamforming based on Huygens principle for multistatic ultrawide band radar: application to breast imaging" IET Microwaves, Antennas . . . , Volume 9, Issue 12, 17 Sep. 2015, p. 1233-1240 DOI: 10.1049/iet-map.2014.0621, Print ISSN 1751-8725, Online ISSN 1751-8733
19. N. Ghavami, G. Tiberi and D. J. Edwards, "Huygens principle-based approach for UWB medical imaging," 2011 41st European Microwave Conference, 2011, pp. 1257-1260, doi: 10.23919/EuMC.2011.6101751.

20. G. Tiberi, N. Ghavami, D. J. Edwards and A. Monorchio, "A mode matching—Bessel functions based approach for UWB microwave imaging," 2010 IEEE Antennas and Propagation Society International Symposium, 2010, pp. 1-4, doi: 10.1109/APS.2010.5561666.

21. N. Ghavami, D. J. Edwards, G. Tiberi, A. Monorchio and G. Manara, "Huygens Principle based technique for microwave imaging of objects with inclusions," 2011 International Conference on Electromagnetics in Advanced Applications, 2011, pp. 1044-1047, doi: 10.1109/ICEAA.2011.6046488.

22. Ghavami, N. (2013). Ultra-wideband imaging techniques for medical applications [PhD thesis]. Oxford University 23. Ultra-Wideband Antennas and Propagation: For Communications, Radar and Imaging Editors: Ben Allen, Mischa Dohler, Ernest Okon, Wasim Malik, Anthony Brown, David Edwards, John Wiley & Sons, 2006, ISBN 0470056827, 9780470056820

24. Navid Ghavami, Gianluigi Tiberi, David J. Edwards, Ahmad Safaai-Jazi, and Agostino Monorchio, "Huygens Principle Based Imaging of Multilayered Objects with Inclusions", Progress In Electromagnetics Research B, Vol. 58, 139-149, 2014, doi:10.2528/PIERB13121002

The invention claimed is:

1. A method of generating a 3-D map of a body, the method comprising:

(a) irradiating the body with coherent microwave radiation having a first frequency and transmitted by a source, (b) detecting at a plurality of locations around the body an amplitude and a phase of radiation that has passed through, or has been reflected by, the body, (c) determining at each location the phase of the received radiation relative to a reference signal indicative of the phase of the transmitted radiation at the first frequency to produce a holographic image of the body, (d) repeating steps (a) to (c) at least once further with coherent microwave radiation having a different frequency to the first frequency to produce at least one further holographic image of the body, wherein step (d) is completed within 250 ms of steps (a) to (c), and (e) processing the first holographic image in combination with the at least one further holographic image to calculate positions in three dimensions of localized physical parameters within the body.

2. The method according to claim 1, wherein step (d) comprises repeating steps (a) to (c) a plurality of further times to produce a plurality of further holographic images of the body, each repetition of steps (a) to (c) utilizing coherent microwave radiation having a different frequency to the frequency of coherent microwave radiation used in any previous iteration of steps (a) to (c), and wherein step (e) comprises processing the first holographic image in combination with the plurality of further holographic images to calculate the positions in three dimensions of localized physical parameters within the body.

3. The method according to claim 2, wherein repeating steps (a) to (c) comprises sweeping through sequentially different frequencies of the coherent microwave radiation.

4. The method according to claim 1, wherein the first holographic image and the at least one further holographic image are produced using microwave radiation transmitted and received with different polarisations.

5. A microwave imaging system for generating a 3-D map of a body, the microwave imaging system being configured to carry out the method of claim 1.

6. The method of claim 1, comprising measuring a surface profile of the body with optical transmitters and receivers or acoustic transmitters and receivers.

* * * * *